United States Patent
Earnshaw et al.

(10) Patent No.: US 8,264,992 B2
(45) Date of Patent: Sep. 11, 2012

(54) CONTROL INFORMATION FEEDBACK OVER THE LONG-TERM EVOLUTION PHYSICAL UPLINK SHARED CHANNEL

(75) Inventors: Andrew Mark Earnshaw, Kanata (CA); Zhijun Cai, Irving, TX (US); Klaus-Peter Alfred Wachsmann, Bochum (DE); Yi Yu, Irving, TX (US)

(73) Assignee: Research In Motion Limited, Waterloo, Ontario (CA)

( * ) Notice: Subject to any disclaimer, the term of this patent is extended or adjusted under 35 U.S.C. 154(b) by 331 days.

(21) Appl. No.: 12/626,325

(22) Filed: Nov. 25, 2009

(65) Prior Publication Data

US 2010/0135181 A1 Jun. 3, 2010

Related U.S. Application Data

(60) Provisional application No. 61/118,143, filed on Nov. 26, 2008.

(51) Int. Cl.
*H04B 7/00* (2006.01)
(52) U.S. Cl. ......................................... 370/310
(58) Field of Classification Search .................. 370/310, 370/328–330, 431, 437, 441–444; 709/227–229
See application file for complete search history.

(56) References Cited

U.S. PATENT DOCUMENTS

| | | | | |
|---|---|---|---|---|
| 7,912,133 | B2 * | 3/2011 | Cheon et al. | 375/240.27 |
| 8,050,227 | B2 * | 11/2011 | Lee et al. | 370/329 |
| 2009/0103482 | A1 * | 4/2009 | Imamura et al. | 370/329 |

OTHER PUBLICATIONS

3GPP TS 23.203 v8.3.1; 3rd Generation Partnership Project; Technical Specification Group Services and System Aspects; Policy and Charging Control Architecture; Release 8; Sep. 2008; 106 pgs.
3GPP TS 23.401 v8.3.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 8; Sep. 2008; 204 pgs.
3GPP TS 36.212 v8.4.0; 3rd Generation Partnership Project; Technical Specification Group Radio Access Network; Evolved Universal Terrestrial Radio Access (E-UTRA); Multiplexing and Channel Coding; Release 8; Sep. 2008; 56 pgs.
3GPP TS 36.213 v8.4.0; 3rd Generation Partnership Project; Technical Specification Group Radio Access Network; Evolved Universal Terrestrial Radio Access (E-UTRA); Physical Layer Procedures; Release 8; Sep. 2008; 60 pgs.

(Continued)

*Primary Examiner* — Dmitry H Levitan
(74) *Attorney, Agent, or Firm* — Conley Rose, P.C.; J. Robert Brown, Jr.

(57) ABSTRACT

A network component comprising a plurality of encoders, a plurality of rate-matching modules coupled to the encoders, and a channel interleaver coupled to the rate-matching modules, wherein the rate-matching modules calculate the number of bits for rate matching a plurality of feedback control information based on a total number of bits allocated to a channel traffic without a traffic data. Included is a network component comprising at least one processor configured to encode a plurality of feedback control information, calculate the number of bits for rate-matching the feedback control information based on a total number of bits allocated to a channel traffic without a traffic data. Included is a method comprising receiving a downlink traffic, detecting a request to transmit uplink data in the downlink traffic, and transmitting feedback control information with or without data based on the request.

9 Claims, 10 Drawing Sheets

OTHER PUBLICATIONS

3GPP TS 36.300 v8.6.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 8; Sep. 2008; 137 pgs.

3GPP TS 36.321 v8.3.0; 3rd Generation Partnership Project; Technical Specification Group Radio Access Network; Evolved Universal Terrestrial Radio Access (E-UTRA) Medium Access Control (MAC) Protocol Specification; Release 8; Sep. 2008; 36 pgs.

* cited by examiner

CONTROL INFORMATION FEEDBACK OVER THE LONG-TERM EVOLUTION PHYSICAL UPLINK SHARED CHANNEL

CROSS-REFERENCE TO RELATED APPLICATIONS

The present application claims priority to U.S. provisional patent application No. 61/118,143, filed Nov. 26, 2008, by Andrew Mark Earnshaw, et al, entitled "Control Information Feedback Over the Long-term Evolution Physical Uplink Shared Channel" (34571-US-PRV-4214-13800), which is incorporated by reference herein as if reproduced in its entirety.

BACKGROUND

Today's telecommunications industry comprises a variety of different radio access technologies (RATs), including Code Division Multiple Access 2000 (CDMA2000), Universal Mobile Telecommunications System (UMTS) Terrestrial Radio Access Network (UTRAN), Global System for Mobile Communications (GSM), GSM Enhanced Data rates for Global Evolution (EDGE) Radio Access Network (GERAN), Generic Access Network (GAN), Wireless Fidelity (WiFi), Wireless Local Area Network (WLAN), General Packet Radio Service (GPRS), Worldwide Interoperability for Microwave Access (WiMAX), 1x Evolution-Data Optimized (1x EV-DO), High-Speed Downlink Packet Access (HSDPA), Digital Enhanced Cordless Technology (DECT), and High Rate Packet Data (HRPD).

Further, next generation networks or next generation equipment, which may be referred to as long-term evolution (LTE), are being developed for future RATs. The LTE comprises more advanced network access equipment, which can provide improved or new services that were not possible previously. For instance, LTE may comprise an enhanced Node B (eNB) that provides a user improved network access, or other devices that are more highly evolved than the equivalent equipment in a traditional wireless telecommunications system. To obtain network access, the user can communicate with the network access equipment, or network access node, via a user equipment (UE) or a user agent (UA) within a range or area, referred to as a cell or a hot spot.

The UE or UA refers to any transportable device with wireless telecommunications capabilities, such as mobile telephones, personal digital assistants, handheld computers, and similar devices. The UE or UA can also refer to a device associated with a Universal Integrated Circuit Card (UICC) that comprises a Subscriber Identity Module (SIM) application, a Universal Subscriber Identity Module (USIM) application, or a Removable User Identity Module (R-UIM) application, or can refer to the device itself without such a card. The UE may communicate with a second UE, some other element in a telecommunications network, an automated computing device, such as a server computer, or some other device, any of which can be referred to as another system. A communications connection between a UE and other systems may promote a voice call, a file transfer, or some other type of data exchange, any of which can be referred to as a call or a session.

The UE communicates with the eNB or other network access equipment by exchanging traffic or information via a plurality of channels. For instance, the UE may send traffic to the eNB via an uplink channel and receive traffic from the eNB via a downlink channel. The uplink and downlink channels may be physical channels that are assigned or associated with network resources. Further, the uplink or downlink channels may be dedicated channels that carry one type of traffic, such as data or control information, or shared channels that carry different types of traffic.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

Figure 1:
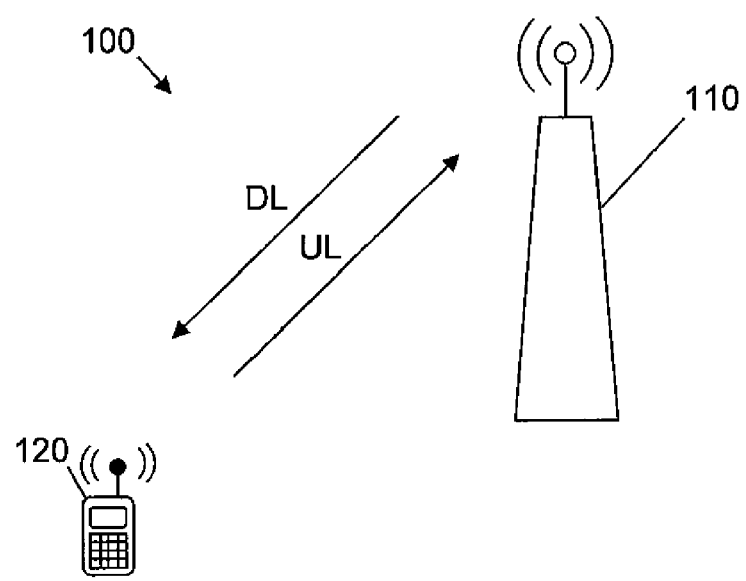
FIG. 1 is a diagram of an embodiment of an LTE system.

It should be understood at the outset that although illustrative implementations of one or more embodiments of the present disclosure are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

In LTE networks, the information exchanged between the UE and the eNB or other network access equipment may comprise control information, which may be exchanged between the eNB and the UE to control and manage traffic transmissions and network resources. The eNB may provide the UE with some control parameters via a downlink channel. In response, the UE may provide control information feedback to the eNB via an uplink channel. For instance, such control information may be transmitted to the eNB via a physical uplink control channel (PUCCH), which may be dedicated for transporting control information without a substantial amount of data. Alternatively, such control information may be transmitted along with data to the eNB via a physical uplink shared channel (PUSCH), which may be more reliable for reception than the PUCCH.

The eNB or other network access equipment may be aware of the presence or absence of the control information in the received PUSCH traffic. For instance, the eNB may expect control information feedback in response to transmitting some data to the UE, await scheduled control information feedback from the UE, or request control information feedback from the UE. However, the eNB may not be aware of the presence or absence of data in the PUSCH traffic, since the eNB may not have information about the content of the UE's buffer. Further, in some cases, the UE may fail to receive a request for data from the eNB, and so the UE may not transmit the data that the eNB expects to receive.

The control information and data may be encoded, multiplexed, and transmitted via the PUSCH, for instance based on an LTE standard. In an embodiment, control information and data may be encoded, multiplexed, and transmitted as described in a 3rd Generation Partnership Project (3GPP) TS 36.212 version 8.4.0, 2008-09, and entitled, "E-UTRA: Multiplexing and channel coding," which is incorporated herein by reference as if reproduced in its entirety. Further, the encoded control information and data sequences or streams may be repeated, duplicated, or punctured as necessary to substantially fill a designated number of modulation symbols, bit vectors, or bits in the PUSCH traffic, which may be referred to as rate-matching. For rate-matching at least some of the control information, the designated number of encoded bits for transmission may be obtained using a predetermined equation, which may depend on the number of bits for rate-matching the data. The eNB may use the designated number of bits, the predetermined equation, or both to decode the control information and data appropriately.

However, in some instances, the control information may be encoded, multiplexed, and transmitted via the PUSCH without the data. Additionally, the number of bits for rate-matching at least some of the control information may be obtained using an equation based on the number of bits for rate-matching the data, for example on the transport block size of the data. Since no data may be present with the control information, the number of bits for the control information may depend on an undefined number of bits for the data, and hence may be undetermined. Consequently, the eNB may be unable to decode the control information appropriately.

Disclosed herein is a system and methods for coding and decoding the control information appropriately when no data is transmitted with the control information via the PUSCH, in order to provide the eNB or other network access equipment with the knowledge of whether the received PUSCH traffic comprises data, control information, or both. Accordingly, when the control information is transmitted without data, the number of bits for rate-matching the control information may be based on a second equation, which may not depend on or comprise a number of bits for rate-matching the data. Alternatively, when no data is transmitted, the control information may be encoded, multiplexed, and transmitted, via the PUSCH, with virtual data. The virtual data may be used to calculate a number of bits or modulation symbols allocated to each information stream but may not be processed or encoded for transmission. Further, the resource elements, e.g. modulation symbols, corresponding to the virtual data may be modulated at about zero signal power, may be assigned special values, for example equal to about zero bits, or both. Additionally, the control information may be rate-matched using an equation based on the number of bits allocated for the virtual data. When the eNB detects the zero signal power associated with the virtual data, the eNB may be aware of the absence of data in the PUSCH traffic. The eNB may also use the equation based on the number of bits allocated for the virtual data to decode the control information. Further, the eNB may send the UE a request to transmit control information without data, and hence may be aware of the absence of the data in the UE's reply via the PUSCH.

FIG. 1 illustrates an embodiment of a RAN 100, which may be an LTE system, for instance as described in 3GPP. FIG. 1 is exemplary and may have other components or arrangements in other embodiments. The RAN 100 may comprise a network access equipment 110 and at least one UE 120. The network access equipment 110 may be an eNB, a base station, or other components that promote network access for the UE 120. The network access equipment 110 may communicate with any UE 120, which may be within the same cell, directly via a direct link. For instance, the direct link may be a point-to-point link established between the network access equipment 110 and the UE 120 and used to transmit and receive signals between the two. The UE 120 may also communicate with at least a second UE 120 within the same cell. Additionally, the access equipment 110 may also communicate with other components or devices to provide for the components of the RAN 100 access to other networks.

The UE 120 may wirelessly communicate, via a wireless link, with the network access equipment 110. The wireless link may conform to any of a plurality of telecommunications standards or initiatives, such as those described in the 3GPP, including LTE, GSM, GPRS/EDGE, High Speed Packet Access (HSPA), and Universal Mobile Telecommunications System (UMTS). Additionally or alternatively, the wireless link may conform to any of a plurality of standards described in the 3GPP2, including Interim Standard 95 (IS-95), Code Division Multiple Access (CDMA) 2000 standards 1xRTT or 1xEV-DO. The wireless link may also be compatible with other standards, such as those described by the Institute of Electrical and Electronics Engineers (IEEE), or other industry forums, such as the WiMAX forum.

The eNB 110 and the UE 120 may wirelessly communicate via at least one downlink channel, at least one uplink channel, or both. The downlink and uplink channels may be physical channels, which may be statically, semi-statically, or dynamically allocated network resources. For instance, the downlink and uplink channels may comprise at least one physical downlink shared channel (PDSCH), at least one physical downlink control channel (PDCCH), at least one PUSCH, at least one PUCCH, or combinations thereof. In an embodiment, the downlink and uplink channels may be established using frequency-division duplexing (FDD), where signals are received and transmitted at different frequencies. Additionally or alternatively, the downlink and uplink channels may be established using time-division duplexing (TDD), where the signals may be transmitted, received, or both at different transmission time intervals (TTIs).

Figure 2:
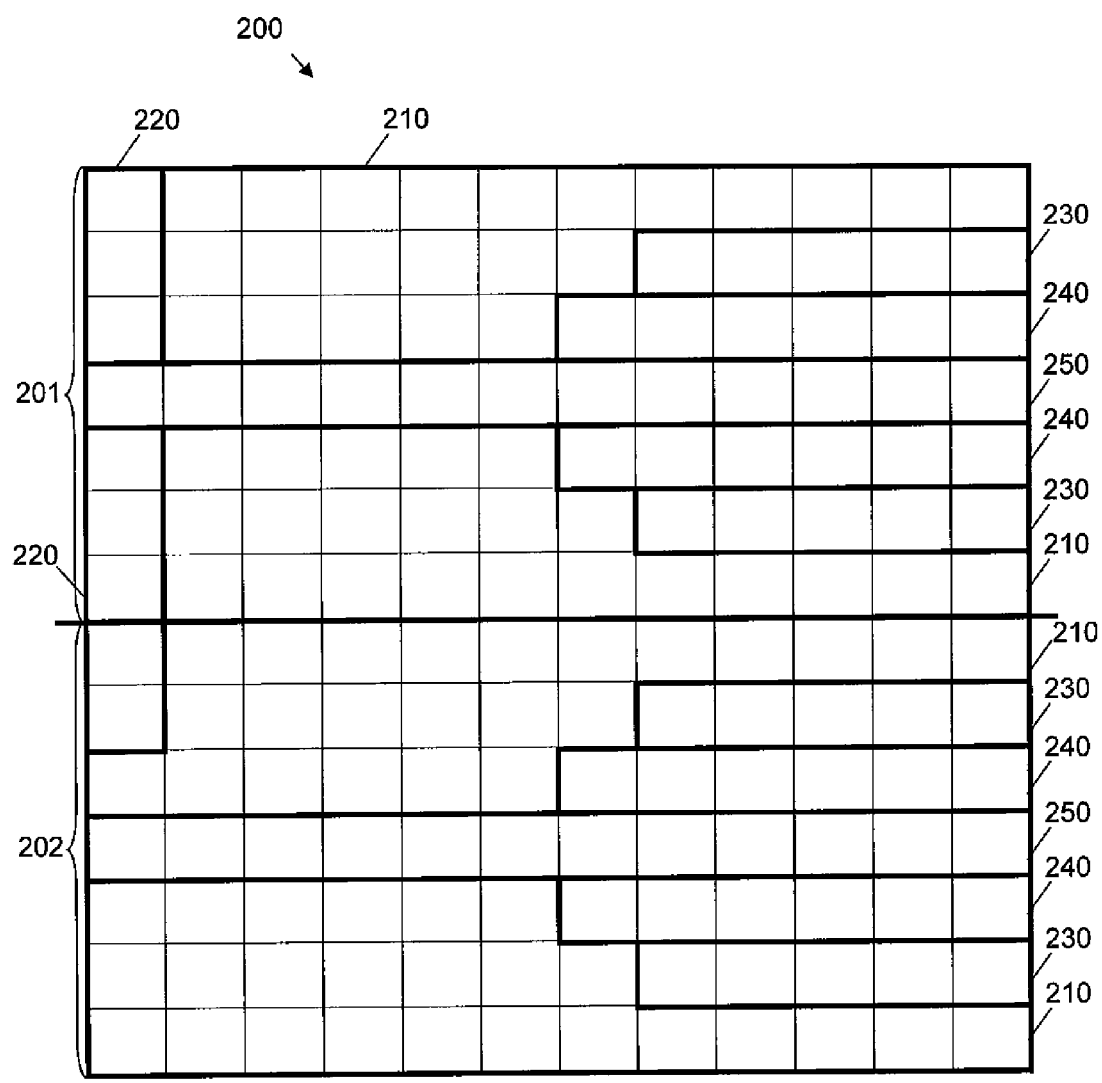
FIG. 2 is a diagram of an embodiment of a physical uplink shared channel (PUSCH) traffic.

FIG. 2 illustrates an embodiment of physical uplink shared channel (PUSCH) traffic 200. In an embodiment, the PUSCH traffic 200 may be distributed over a plurality of resource blocks, each comprising a plurality of blocks, such as Discrete Fourier Transform (DFT) blocks. For instance, the PUSCH traffic 200 may comprise a first resource block 201 and a second resource block 202, which may each comprise seven blocks or SC-FDMA symbols using a normal cyclic prefix configuration, for instance, corresponding to the rows in each of the two. Each block may comprise a plurality of resource elements or modulation symbols, which are shown as a plurality of square blocks in each row. Each square block may comprise a plurality of bits used to encode a modulation symbol, and may be referred to as a bit vector. Further, the first resource block 201 and second resource block 202 may each comprise control information, data, or both. For instance, the first resource block 201 and second resource block 202 may each comprise at least one uplink shared channel (UL-SCH)

transport data 210, at least one channel quality information (CQI) 220, at least one rank indication (RI) 230, at least one hybrid automatic repeat request acknowledgement (HARQ-ACK) 240, one demodulation reference signal 250, or combinations thereof.

The UL-SCH transport data 210 may comprise the data transmitted from the UE 120 to the eNB 110, and the bit vectors of the UL-SCH transport data 210 may comprise a variable number of bits. The CQI 220, the RI 230, and the HARQ-ACK 240 may comprise feedback control information. For instance, the CQI 220 may describe the downlink transmission channel conditions as observed by the UE 120, and its bit vectors may also comprise a variable number of bits. The RI 230 may indicate the number of spatial layers, which may be supported by the UE 120 on the downlink with the current transmission channel conditions. The HARQ-ACK 240 may provide acknowledgement feedback for successfully or unsuccessfully decoding downlink transmissions. The input information for the RI 230, the HARQ-ACK 240, or both may each comprise about one bit or about two bits depending on the number of supported spatial layers and the number of downlink transport blocks, respectively. The encoded bit vectors of the RI 230, the HARQ-ACK 240, or both may each comprise a larger number of bits than its input information. The reference signal 250 may comprise a demodulation reference signal (DMRS), which may comprise a fixed number of resource elements in each resource block. The DMRS may be used by the eNB 110 to demodulate the PUSCH signal and hence obtain the control information and data appropriately. In some instances, when the UE 120 may not have an uplink resource allocation for the PUSCH, at least some of the feedback control information, for example the CQI 220, the RI 230, the HARQ-ACK 240, or combinations thereof, may be transmitted to the eNB 110 via a PUCCH.

Figure 3:
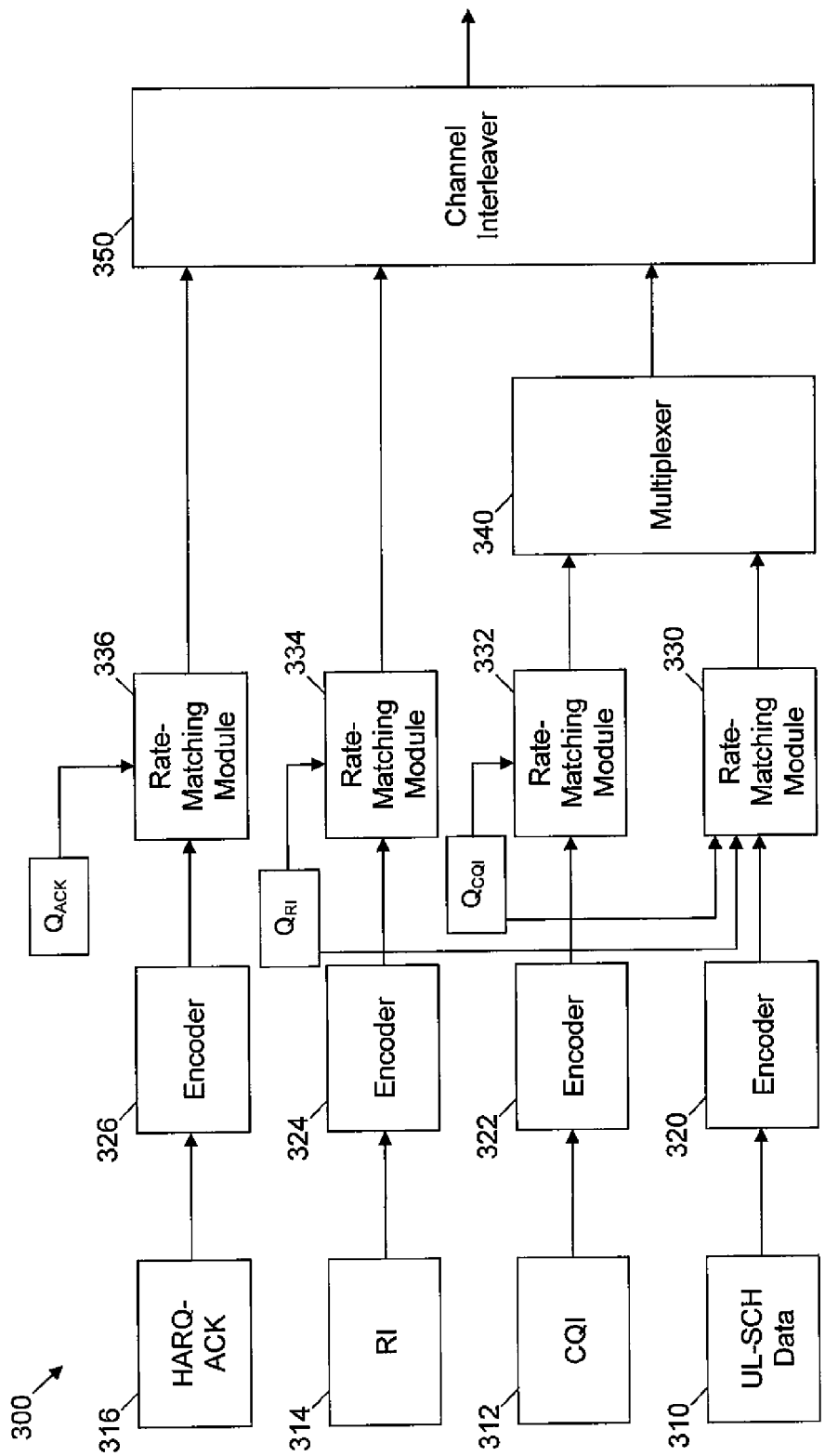
FIG. 3 is a diagram of an embodiment of a PUSCH traffic processing system.

FIG. 3 illustrates an embodiment of a PUSCH traffic processing system 300, which may be used to obtain the PUSCH traffic 200. The PUSCH traffic processing system 300 may comprise a plurality of encoders 320, 322, 324, and 326, which may each receive one corresponding element of the PUSCH traffic 200 including an UL-SCH transport data 310, a CQI 312, an RI 314, and a HARQ-ACK 316. In some instances, at least one of the encoders 320, 322, 324, and 326 may not receive its corresponding element. The received UL-SCH transport data 310, CQI 312, RI 314, and HARQ-ACK 316 may not be configured for PUSCH transmission, for instance may not be converted into appropriate modulation symbols. The encoders 320, 322, 324, and 326 may each encode one of the UL-SCH transport data 310, the CQI 312, the RI 314, and the HARQ-ACK 316 based on a network standard.

Additionally, the PUSCH traffic processing system 300 may comprise a plurality of rate-matching modules 330, 332, 334, and 336, which may each be coupled to one of the encoders 320, 322, 324, and 326. Hence, the rate-matching modules 330, 332, 334, and 336 may receive encoded versions of the UL-SCH transport data 310, the CQI 312, the RI 314, and the HARQ-ACK 316, respectively, and rate-match each based on a network standard. The PUSCH traffic processing system 300 may also comprise a multiplexer 340, which may be coupled to the rate-matching modules 330 and 332, and a channel interleaver 350, which may be coupled to the rate-matching modules 334 and 336 and the multiplexer 340. Accordingly, the multiplexer 340 may receive rate-matched versions of the UL-SCH transport data 310 and the CQI 312, and multiplex or concatenate the two. Hence, the interleaver 350 may receive rate-matched versions of the RI 314, and the HARQ-ACK 316 and the concatenated or multiplexed UL-SCH transport data 310 and CQI 312. The interleaver 350 may then combine the rate-matched version of the RI 314 with the multiplexed UL-SCH transport data 310 and CQI 312, and may puncture the rate-matched version of the HARQ-ACK 316 into the combined RI 314 and the multiplexed UL-SCH transport data 310 and CQI 312.

In an embodiment, the encoder 326 may encode the HARQ-ACK 316 according to Tables 5.2.2.6-1 and 5.2.2.6-2 of the 3GPP TS 36.212 version 8.4.0 and the encoder 324 may encode the RI 314 according to Tables 5.2.2.6-3 and 5.2.2.6-4 of the 3GPP TS 36.212 version 8.4.0. Hence, the rate-matching modules 334 and 336 may repeat the modulation symbols or bit vectors of the encoded versions of the HARQ-ACK 316 and the RI 314, respectively, to obtain or reach a sufficient quantity to fill the corresponding resource elements of the PUSCH. A number of bits $Q_{ACK}$ for rate-matching the encoded version of the HARQ-ACK 316 and a number of bits $Q_{RI}$ for rate-matching the encoded version of the RI 314 may be calculated using a product of a first equation for a value Q' from section 5.2.2.6 of the 3GPP TS 36.212 version 8.4.0 and a modulation order $Q_m$.

Additionally, when the CQI 312 may comprise a payload smaller than or equal to about eleven bits, the encoder 322 may encode the CQI 312 according to section 5.2.2.6.4 of the 3GPP TS 36.212 version 8.4.0. Hence, the rate-matching module 332 may repeat the bits of the encoded version of the CQI 312 to obtain or reach a sufficient quantity to fill the corresponding resource elements of the PUSCH. A number of bits $Q_{CQI}$ or Q for rate-matching the encoded version of the CQI 312 may be calculated using a second equation for the value Q' from section 5.2.2.6 of the 3GPP TS 36.212 version 8.4.0. Alternatively, when the CQI 312 may comprise a payload larger than about eleven bits, the encoder 322 may encode the CQI 312 using tail-biting convolutional encoding after adding about eight cyclic redundancy check (CRC) bits to the CQI 312. Hence, the rate-matching module 332 may repeat or puncture bits of the encoded version of the CQI 312 to reach a number of bits $Q_{CQI}$, which may be calculated using a rate-matching algorithm from section 5.1.4.2 of the 3GPP TS 36.212 version 8.4.0.

The rate-matching modules 330 may repeat or puncture the bits of the encoded version of the UL-SCH transport data 310 to substantially fill the available or remaining space within the PUSCH resource allocation. A number of bits for rate-matching the encoded version of the UL-SCH transport data 310 may be calculated by computing the total number of bits that may be used within the PUSCH allocation, and subtracting $Q_{CQI}$ and $Q_{RI}$ from the total number of bits, independent of $Q_{ACK}$ since the rate-matched version of the HARQ-ACK 316 may be punctured into the other three elements of the PUSCH traffic.

Figure 4:
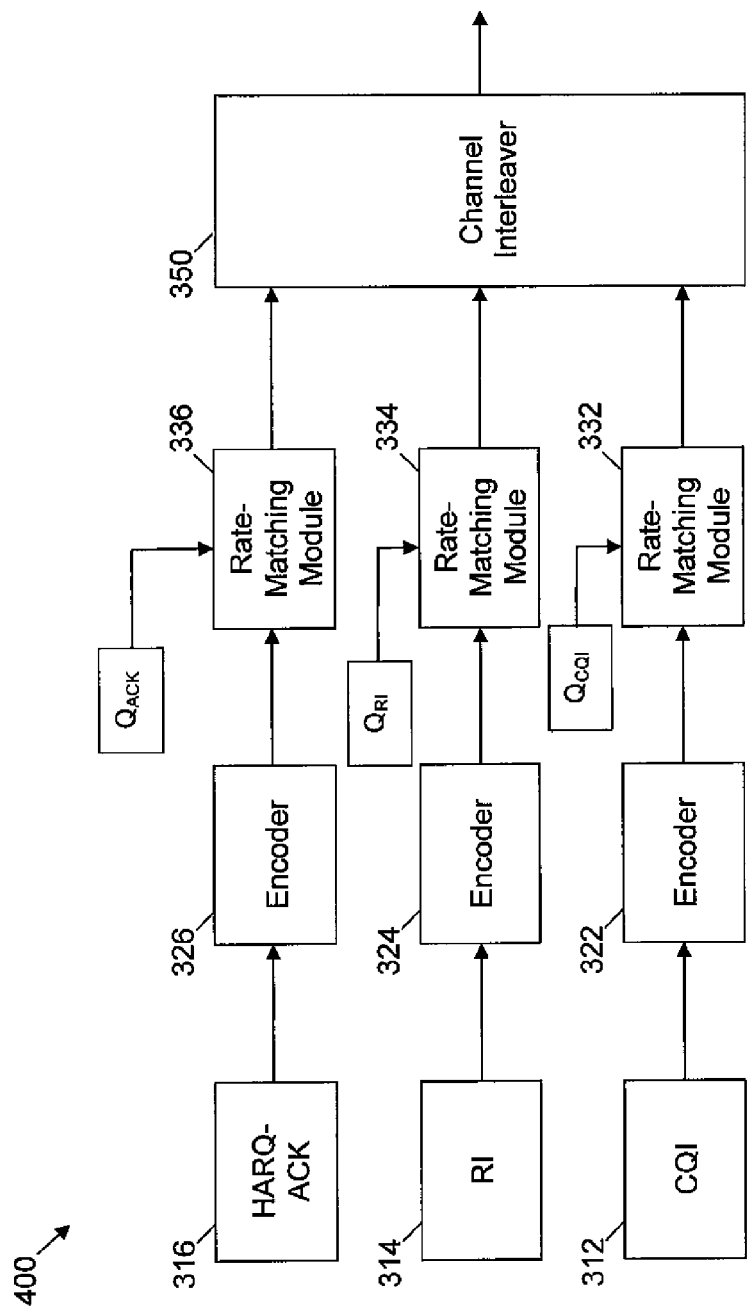
FIG. 4 is a diagram of another embodiment of a PUSCH traffic processing system.

FIG. 4 illustrates another embodiment of a PUSCH traffic processing system 400, which may be used to obtain the PUSCH traffic 200. Specifically, the PUSCH traffic processing system 400 may receive or process control information without data, such as UL-SCH transport data. The PUSCH traffic processing system 400 may comprise some of the components of the PUSCH traffic processing system 300, including the encoders 322, 324, and 326, which may each receive one corresponding element of the PUSCH traffic including the CQI 312, the RI 314, and the HARQ-ACK 316. Additionally, the PUSCH traffic 200 processing system 400 may comprise the rate-matching modules 332, 334, and 336, which may each be coupled to one of the encoders 322, 324, and 326, respectively, and the channel interleaver 350, which may be coupled to the rate-matching modules 332, 334, and 336.

The components of the PUSCH traffic processing system 400 may process the received elements of the PUSCH traffic substantially similar to the corresponding components of the PUSCH traffic processing system 300 with some differences, for instance according to section 5.2.4 of the 3GPP TS 36.212 version 8.4.0. For example, the number of bits for rate-matching the elements of the PUSCH traffic, e.g. $Q_{CQI}$, $Q_{RI}$, and $Q_{ACK}$ may be calculated using a product of a third equation for the value Q' from section 5.2.4.1 of the 3GPP TS 36.212 version 8.4.0 and the modulation order $Q_m$. As such, the number of bits for rate-matching the RI 314, the HARQ-ACK 316, or both may be larger than the number of bits calculated using the first equation above, and hence more bits may be allocated for these two elements of the PUSCH traffic 200 in comparison to the case where the UL-SCH transport data 310 is also processed. Further, according to section 5.2.4 of the 3GPP TS 36.212 version 8.4.0, the number of bits $Q_{CQI}$ for rate-matching the encoded version of the CQI 312 may be calculated using a second equation for the value Q' from section 5.2.2.6 of the 3GPP TS 36.212 version 8.4.0. However, the second equation may comprise in its denominator a summation $$\sum_{r=0}^{C-1} K_r$$

of a plurality of code block sizes $K_r$ for the UL-SCH transport data 310, which may be undefined or equal to zero since no UL-SCH data may be processed in the PUSCH traffic processing system. Consequently, the calculated value $Q_{CQI}$ may be undetermined due to a division by a zero value. Hence, calculating $Q_{CQI}$ using the second equation from section 5.2.2.6 of the 3GPP TS 36.212 version 8.4.0 may not be possible or appropriate.

The PUSCH traffic may comprise control information without data when the eNB 110 does not receive an up-to-date or complete buffer status report from the UE 120, for instance in previously transmitted data. As such, the eNB 110 may continue to issue uplink grants even when no data is being sent from the UE 120, which may result in transmitting additional PUSCH traffic without data. When the UE 120 has data to send but does not have sufficient resources to send a request to the eNB 110 for additional resource allocation to transmit the data, the UE 120 may send a scheduling request (SR) via the PUCCH to the eNB 110. Occasionally, the eNB 110 may incorrectly conclude that it has received an SR from the UE 120 when in fact no such SR was transmitted by the UE 120. Hence, the eNB 110 may issue an unrequested uplink resource grant, which may also result in the UE 120 transmitting PUSCH traffic without data.

In some instances, the UE 120 may remove data from its transmission queue, for instance following a handover or when the data is expired. However, the eNB 110 may not be aware of the data removal and issue an uplink grant to receive the data, hence resulting in transmitting additional PUSCH traffic without data. On the other hand, the eNB 110 may be aware that the UE 120 has no data to send and issue the uplink grant to receive the control information without data from UE 120. If the UE 120 becomes ready to transmit new data after receiving the uplink grant, it may use the issued uplink grant to transmit data with the control information via the PUSCH, which may not be expected by the eNB 110.

Further, the UE 120 may fail to decode a downlink control information (DCI) format zero received on a PDCCH and associated with transmitting new uplink data. The eNB 110 may then issue a new DCI format zero to request an adaptive retransmission from the UE 120 and set a modulation and coding scheme (MCS) field to indicate that a previous MCS signal level should be used. For instance, the MCS field may be set to a value equal to about 29, about 30, or about 31, as described in Table 8.6.1-1 of the 3GPP TS 36.213 version 8.4.0, 2008-09, and entitled, "E-UTRA: Physical layer procedures," which is incorporated herein by reference as if reproduced in its entirety. However, since the UE 120 missed decoding the original DCI format zero, it may not know the previous MCS signal level. As such, the UE 120 may have the resources for transmission but may not be able to obtain a correct or appropriate transport block size, and hence may transmit control information without the data via the PUSCH.

Figure 5:
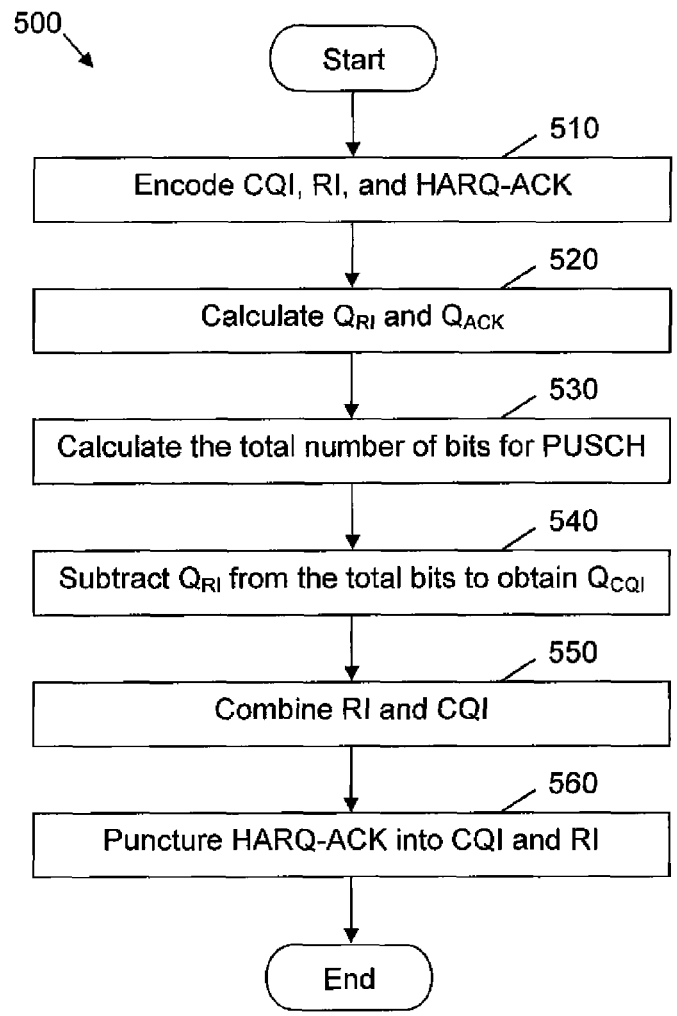
FIG. 5 is a flowchart of an embodiment of a PUSCH traffic processing method.

FIG. 5 illustrates an embodiment of a PUSCH traffic processing method 500, which may be implemented when the PUSCH traffic may comprise control information without data. Specifically, similar to the $Q_{RI}$ and $Q_{ACK}$, the $Q_{CQI}$ for rate-matching the CQI may be calculated using a scheme or an equation independent of data or UL-SCH transport data resource allocation, which may be undetermined or set equal to about zero. Hence, all the elements of the PUSCH traffic, e.g. CQI, RI, and HARQ-ACK may be encoded, rate-matched, and combined appropriately for transmission via the PUSCH.

In an embodiment, the PUSCH traffic processing method 500 may start at block 510, where the CQI, RI, and HARQ-ACK may be encoded, for instance using dedicated encoders as described above. At block 520, the PUSCH traffic processing method 500 may calculate $Q_{RI}$ for rate-matching the RI and $Q_{ACK}$ for rate-matching the HARQ-ACK, for instance according to section 5.2.4.1 of the 3GPP TS 36.212 version 8.4.0, as described above. At block 530, the PUSCH traffic processing method 500 may calculate the total number of bits or resource elements allocated for the PUSCH traffic. For instance, the PUSCH traffic processing method 500 may obtain the quantity of resource elements or modulation symbols and the sizes of each in bits.

At block 540, the PUSCH traffic processing method 500 may calculate $Q_{CQI}$ for rate-matching the CQI by subtracting $Q_{RI}$ from the total number of allocated bits or resource elements. At block 550, the PUSCH traffic processing method 500 may combine the rate-matched CQI and RI, for instance using a channel interleaver as described above. Next, at block 560, the PUSCH traffic processing method 500 may puncture the rate-matched HARQ-ACK into the combined CQI and RI, for instance using the channel interleaver.

The PUSCH traffic processing method 500 may replace at least some part of the current scheme or equation to process PUSCH traffic comprising control information without data. For instance, the PUSCH traffic processing method 500 may be used instead of some of the parts of section 5.2.4 of the 3GPP TS 36.212 version 8.4.0, such as using the second equation for the value Q' from section 5.2.2.6 of the 3GPP TS 36.212 version 8.4.0 to obtain $Q_{CQI}$, which may result in an undetermined value for $Q_{CQI}$, as described above.

In other embodiments, the PUSCH traffic may be received, for instance by the eNB 110, and processed in a manner similar to the PUSCH traffic processing method 500 to obtain the transmitted control traffic. As such, the rate-matched CQI, RI, and HARQ-ACK may be separated and processed or decoded using the $Q_{CQI}$, $Q_{RI}$, and $Q_{ACK}$ values, which may be calculated as described above.

Figure 6:
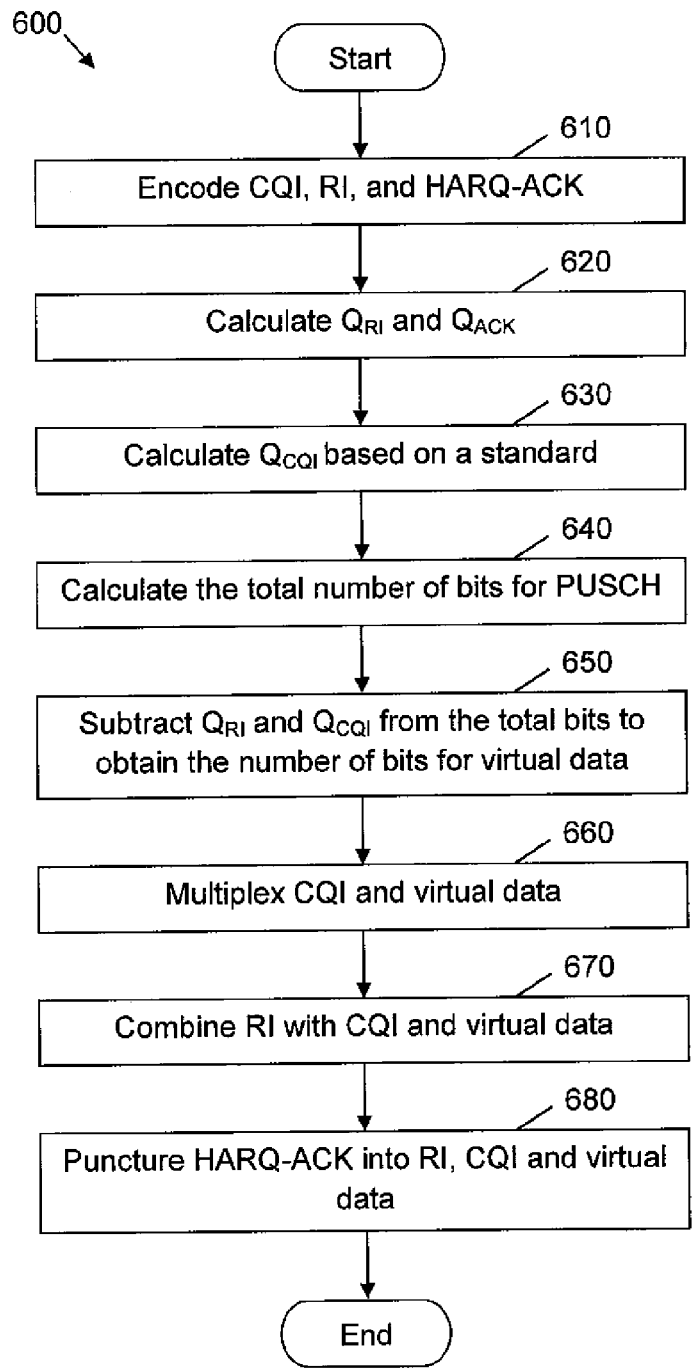
FIG. 6 is a flowchart of another embodiment of a PUSCH traffic processing method.

FIG. 6 illustrates an alternative embodiment of a PUSCH traffic processing method 600, which may also be implemented when the PUSCH traffic may comprise control information without data. Specifically, the $Q_{CQI}$, $Q_{RI}$, and $Q_{ACK}$ may be calculated using current schemes or equations, which may be dependent on the number of allocated resource elements or bits for UL-SCH transport data. However, since no such data may be included in the PUSCH traffic, the resource elements or bits that would be allocated for UL-SCH transport data may comprise virtual data instead of the UL-SCH transport data. For instance, a code segmentation procedure described in section 5.1.2 of TS 36.212 version 8.4.0 may be applied to the virtual data to obtain a value C and a value Kr, which are used in section 5.2.2.6 of TS 36.212 version 8.4.0. Such virtual data may be used for determining resource element assignments and mappings for the control information streams but is not actually encoded or transmitted. In an embodiment, the size of the virtual data is equal to about the allocated transport block size in the PDCCH uplink grant. In an embodiment, the virtual data may not be actually encoded or transmitted. Instead, the resource elements associated with the virtual data may be modulated using a different modulation than that of the UL-SCH transport data, for example a modulation with a power level of about zero, which may then be detected to distinguish the virtual data from the UL-SCH transport data. For example, the eNB may be able to detect the presence of real UL-SCH data or virtual data by measuring the average power level of the received signal for the appropriate resource elements. Hence, the presence or absence of data may be known when the presence or absence of virtual data is detected, and the control information may be decoded in a standard or conventional manner similar to the case of decoding control information with data. In another embodiment, the virtual data may be assigned at least one special value or the resource elements associated with the virtual data may be padded. Hence, the virtual data may be encoded and combined with the control information. The virtual data may then be decoded and distinguished from the UL-SCH transport data when the special value is detected.

In an embodiment, the PUSCH traffic processing method 600 may start at block 610, where the CQI, RI, and HARQ-ACK may be encoded, for instance using separate encoders or encoding schemes. At block 620, the PUSCH traffic processing method 600 may calculate $Q_{RI}$ for rate-matching the RI and $Q_{ACK}$ for rate-matching the HARQ-ACK, for instance according to section 5.2.2.6 of the 3GPP TS 36.212 version 8.4.0. At block 630, the PUSCH traffic processing method 600 may calculate $Q_{CQI}$ for rate-matching the CQI, for instance according to section 5.2.2.6 or section 5.1.4.2 of the 3GPP TS 36.212 version 8.4.0 based on its bit size, as described above.

At block 640, the PUSCH traffic processing method 600 may calculate the total number of bits allocated for the PUSCH, for instance by obtaining the total number of bits in the resource elements or modulation symbols. At block 650, the PUSCH traffic processing method 600 may calculate the number of bits for rate-matching the virtual data by subtracting $Q_{RI}$ and $Q_{CQI}$ from the total number of bits. The PUSCH traffic processing method 600 may then pad the bits allocated for the virtual data, if necessary, for instance by setting the bits to zeros or to a special place-holder value. As such, the virtual data modulation symbols may be transmitted at reduced power levels in comparison to the modulation symbols for UL-SCH transport data, which may save some power for transmission at the UE 120 or reception at the eNB 110.

At block 660, the PUSCH traffic processing method 600 may multiplex or concatenate the rate-matched CQI and virtual data, for instance using a multiplexer. At block 670, the PUSCH traffic processing method 600 may combine the rate-matched RI with the concatenated CQI and virtual data, for instance using a channel interleaver. At block 680, the PUSCH traffic processing method 600 may puncture the rate-matched HARQ-ACK into the combined virtual data, CQI, and RI, for instance using the channel interleaver.

Since, the control information may be transmitted via the PUSCH with real data or virtual data, the situation of transmitting PUSCH traffic comprising only control traffic may be avoided. Hence the prior schemes or equations for handling such a situation, for instance as described in section 5.2.4 of the 3GPP TS 36.212 version 8.4.0, may become obsolete and may be discarded or dropped from consideration in the LTE system. Further, since the PUSCH traffic processing method 600 may always process UL-SCH traffic in addition to the control traffic, fewer resource elements may be allocated to the control traffic in comparison to the PUSCH traffic processing method 500, which may process the control traffic without additional traffic.

Figure 7:
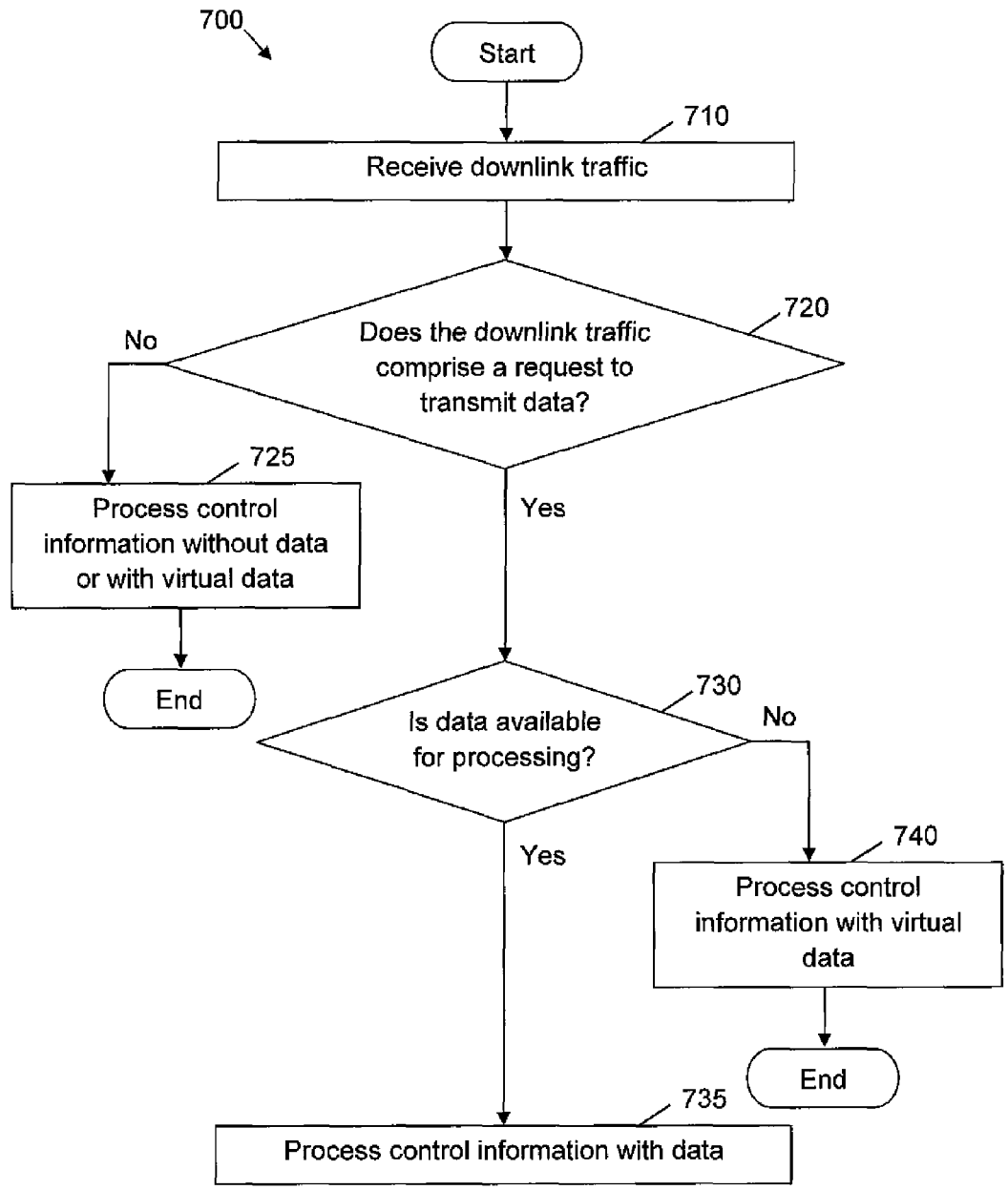
FIG. 7 is a flowchart of another embodiment of a PUSCH traffic processing method.

FIG. 7 illustrates an embodiment of a PUSCH traffic processing method 700, which may be used to provide the eNB 110 or other network access equipment with the knowledge of the presence of data in the PUSCH traffic. Hence, the PUSCH traffic processing method 700 may be used to improve the PUSCH traffic processing or decoding, and to avoid at least some of the cases where the UE 120 transmits the control information with data, which may not be expected by the eNB 110. Further, the PUSCH traffic processing method 700 may be used to improve the reliability of control information feedback by allocating the available resources, which may be limited to the control information without data. Specifically, the control information may be transmitted without data when no request to transmit data is issued, and the control information may be transmitted with data upon receiving a request to transmit data.

In an embodiment, the PUSCH traffic processing method 700 may start at block 710, where the UE 120 may receive traffic on a downlink channel, such as a PDCCH. At block 720, the PUSCH traffic processing method 700 may verify whether the received traffic comprises a request to transmit data via the PUSCH. For instance, the UE 110 may decode a DCI format zero received on the PDCCH, which may be configured to indicate whether the PUSCH resources are allocated for control information without data or for control information with data. Accordingly, the DCI format zero may comprise an additional bit flag, which may be set to request the transmission of control information with data. Alternatively, at least one existing bit of the DCI format zero may be used to enable data transmission. For instance, section 5.3.3.1.1 of the 3GPP TS 36.212 version 8.4.0 may be updated to specify setting both a "Dedicated Control Information" flag and a "CQI Request" of the DCI format zero to indicate whether a PUSCH resource allocation should be used for UL-SCH data, control information, or both. If the PUSCH resources are allocated for the control information without data, the PUSCH traffic processing method 700 may proceed to block 725. Otherwise, the PUSCH traffic processing method 700 may proceed to block 730.

At block 725, the PUSCH traffic processing method 700 may process the PUSCH traffic without data using the PUSCH traffic processing method 500 to allocate a larger number of resources for control information. Alternatively, the PUSCH traffic processing method 700 may process the PUSCH traffic with virtual data using the PUSCH traffic processing method 600 to transmit the PUSCH traffic in an expected or easier to process standard format. At block 730, the PUSCH traffic processing method 700 may verify whether data is available for transmission. The PUSCH traffic processing method 700 may proceed to block 735 if the condition is met. Otherwise, the PUSCH traffic processing method 700 may proceed to block 740. At block 735, the PUSCH traffic processing method 700 may process the control information and data based on an established standard, as described above. At block 740, the PUSCH traffic processing method 700 may process the PUSCH traffic with virtual data using the PUSCH traffic processing method 600.

In another embodiment, the PUSCH traffic processing method 700 may process the PUSCH traffic without data using the PUSCH traffic processing method 500 when the PUSCH resources are allocated for control information without data (at block 725). On the other hand, the PUSCH traffic processing method 700 may process the PUSCH traffic with virtual data when the PUSCH resources are allocated for control information and data but no data is available for transmission.

Figure 8:
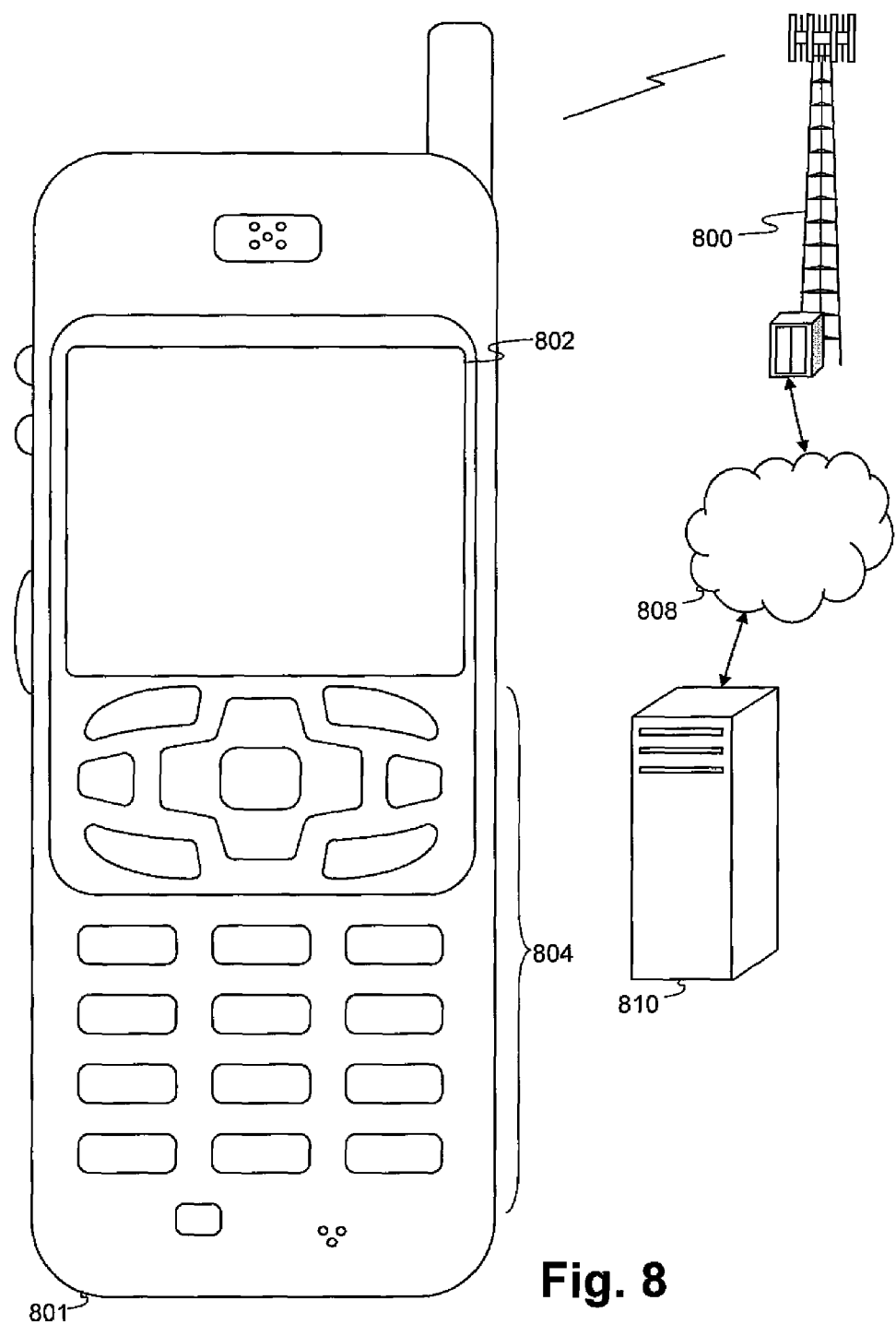
FIG. 8 is a diagram of an embodiment of a wireless communications system including a UE operable for some of the various embodiments of the disclosure.

FIG. 8 illustrates a wireless communications system including a UE 801 which may be an embodiment of the UE 120 illustrated in FIG. 1. The UE 801 is operable for implementing aspects of the disclosure, but the disclosure should not be limited to these implementations. Though illustrated as a mobile phone, the UE 801 may take various forms including a wireless handset, a pager, a personal digital assistant (PDA), a portable computer, a tablet computer, or a laptop computer. Many suitable devices combine some or all of these functions. In some embodiments of the disclosure, the UE 801 is not a general purpose computing device like a portable, laptop or tablet computer, but rather is a special-purpose communications device such as a mobile phone, a wireless handset, a pager, a PDA, or a telecommunications device installed in a vehicle. In another embodiment, the UE 801 may be a portable, laptop or other computing device. The UE 801 may support specialized activities such as gaming, inventory control, job control, and/or task management functions, and so on.

The UE 801 comprises a display 802. The UE 801 also comprises a touch-sensitive surface, a keyboard or other input keys generally referred as 804 for input by a user. The keyboard may be a full or reduced alphanumeric keyboard such as QWERTY, Dvorak, AZERTY, and sequential types, or a traditional numeric keypad with alphabet letters associated with a telephone keypad. The input keys may comprise a trackwheel, an exit or escape key, a trackball, and other navigational or functional keys, which may be inwardly depressed to provide further input function. The UE 801 may present options for the user to select, controls for the user to actuate, and/or cursors or other indicators for the user to direct.

The UE 801 may further accept data entry from the user, including numbers to dial or various parameter values for configuring the operation of the UE 801. The UE 801 may further execute one or more software or firmware applications in response to user commands. These applications may configure the UE 801 to perform various customized functions in response to user interaction. Additionally, the UE 801 may be programmed and/or configured over-the-air, for example from a wireless base station, a wireless access point, or a peer UE 801.

Among the various applications executable by the UE 801 are a web browser, which enables the display 802 to show a web page. The web page may be obtained via wireless communications with a wireless network access node, a cell tower, a peer UE 801, or any other wireless communication network or system 800. The network 800 is coupled to a wired network 808, such as the Internet. Via the wireless link and the wired network, the UE 801 has access to information on various servers, such as a server 810. The server 810 may provide content that may be shown on the display 802. Alternately, the UE 801 may access the network 800 through a peer UE 801 acting as an intermediary, in a relay type or hop type of connection.

Figure 9:
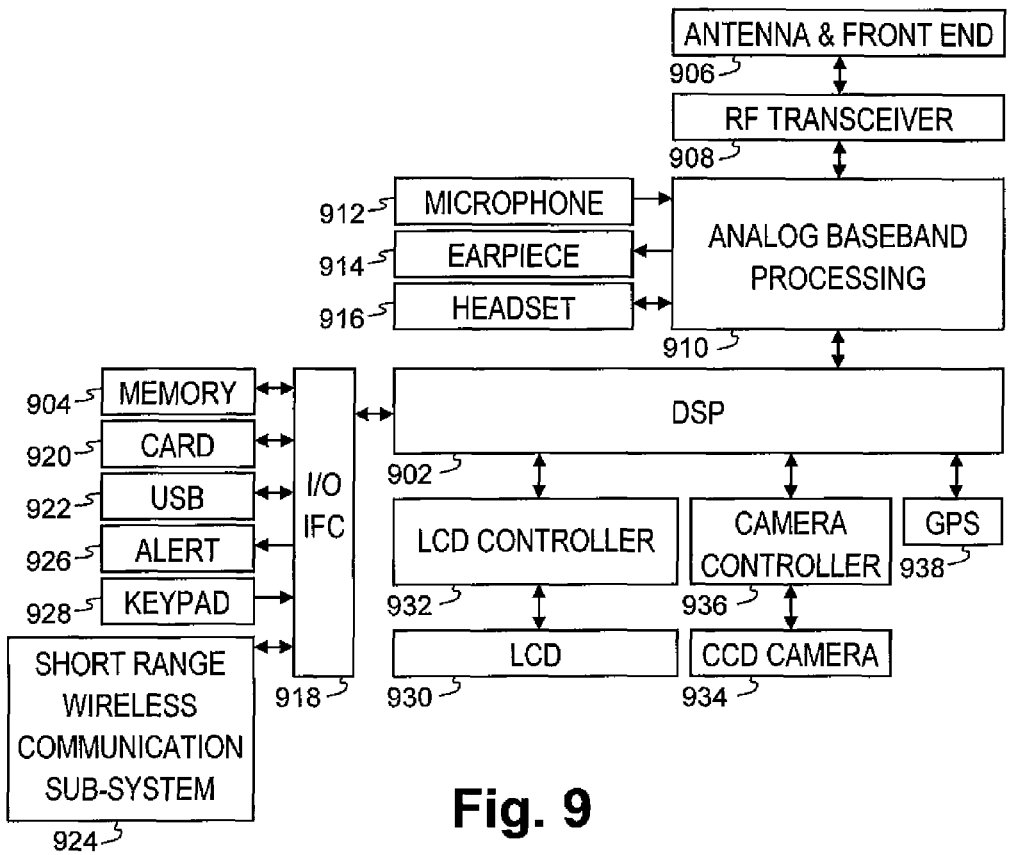
FIG. 9 is a diagram of an embodiment of a UE operable for some of the various embodiments of the disclosure.

FIG. 9 shows a block diagram of the UE 801. While a variety of known components of UEs 801 are depicted, in an embodiment a subset of the listed components and/or additional components not listed may be included in the UE 801. The UE 801 includes a digital signal processor (DSP) 902 and a memory 904. As shown, the UE 801 may further include an antenna and front end unit 906, a radio frequency (RF) transceiver 908, an analog baseband processing unit 910, a microphone 912, an earpiece speaker 914, a headset port 916, an input/output interface 918, a removable memory card 920, a universal serial bus (USB) port 922, a short range wireless communication sub-system 924, an alert 926, a keypad 928, a liquid crystal display (LCD), which may include a touch sensitive surface 930, an LCD controller 932, a charge-coupled device (CCD) camera 934, a camera controller 936, and a global positioning system (GPS) sensor 938. In an embodiment, the UE 801 may include another kind of display that does not provide a touch sensitive screen. In an embodiment, the DSP 902 may communicate directly with the memory 904 without passing through the input/output interface 918.

The DSP 902 or some other form of controller or central processing unit operates to control the various components of the UE 801 in accordance with embedded software or firmware stored in memory 904 or stored in memory contained within the DSP 902 itself. In addition to the embedded software or firmware, the DSP 902 may execute other applications stored in the memory 904 or made available via information carrier media such as portable data storage media like the removable memory card 920 or via wired or wireless network communications. The application software may comprise a compiled set of machine-readable instructions that configure the DSP 902 to provide the desired functionality, or the application software may be high-level software instructions to be processed by an interpreter or compiler to indirectly configure the DSP 902.

The antenna and front end unit 906 may be provided to convert between wireless signals and electrical signals, enabling the UE 801 to send and receive information from a cellular network or some other available wireless communications network or from a peer UE 801. In an embodiment, the antenna and front end unit 906 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 906 may include antenna tuning and/or impedance matching components, RF power amplifiers, and/or low noise amplifiers.

The RF transceiver 908 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 910 and/or the DSP 902 or other central processing unit. In some embodiments, the RF Transceiver 908, portions of the Antenna and Front End 906, and the analog baseband processing unit 910 may be combined in one or more processing units and/or application specific integrated circuits (ASICs).

The analog baseband processing unit 910 may provide various analog processing of inputs and outputs, for example analog processing of inputs from the microphone 912 and the headset 916 and outputs to the earpiece 914 and the headset 916. To that end, the analog baseband processing unit 910 may have ports for connecting to the built-in microphone 912 and the earpiece speaker 914 that enable the UE 801 to be used as a cell phone. The analog baseband processing unit 910 may further include a port for connecting to a headset or other hands-free microphone and speaker configuration. The analog baseband processing unit 910 may provide digital-to-analog conversion in one signal direction and analog-to-digital conversion in the opposing signal direction. In some embodiments, at least some of the functionality of the analog baseband processing unit 910 may be provided by digital processing components, for example by the DSP 902 or by other central processing units.

The DSP 902 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 902 may perform modulation, coding, interleaving, and spreading, and for a receiver function the DSP 902 may perform despreading, deinterleaving, decoding, and demodulation. In another embodiment, for example in an orthogonal frequency division multiplex access (OFDMA) technology application, for the transmitter function the DSP 902 may perform modulation, coding, interleaving, inverse fast Fourier transforming, and cyclic prefix appending, and for a receiver function the DSP 902 may perform cyclic prefix removal, fast Fourier transforming, deinterleaving, decoding, and demodulation. In other wireless technology applications, yet other signal processing functions and combinations of signal processing functions may be performed by the DSP 902.

The DSP 902 may communicate with a wireless network via the analog baseband processing unit 910. In some embodiments, the communication may provide Internet connectivity, enabling a user to gain access to content on the Internet and to send and receive e-mail or text messages. The input/output interface 918 interconnects the DSP 902 and various memories and interfaces. The memory 904 and the removable memory card 920 may provide software and data to configure the operation of the DSP 902. Among the interfaces may be the USB interface 922 and the short range wireless communication sub-system 924. The USB interface 922 may be used to charge the UE 801 and may also enable the UE 801 to function as a peripheral device to exchange information with a personal computer or other computer system. The short range wireless communication sub-system 924 may include an infrared port, a Bluetooth interface, an IEEE 802.11 compliant wireless interface, or any other short range wireless communication sub-system, which may enable the UE 801 to communicate wirelessly with other nearby mobile devices and/or wireless base stations.

The input/output interface 918 may further connect the DSP 902 to the alert 926 that, when triggered, causes the UE 801 to provide a notice to the user, for example, by ringing, playing a melody, or vibrating. The alert 926 may serve as a mechanism for alerting the user to any of various events such as an incoming call, a new text message, and an appointment reminder by silently vibrating, or by playing a specific pre-assigned melody for a particular caller.

The keypad 928 couples to the DSP 902 via the interface 918 to provide one mechanism for the user to make selections, enter information, and otherwise provide input to the UE 801. The keyboard 928 may be a full or reduced alphanumeric keyboard such as QWERTY, Dvorak, AZERTY and sequential types, or a traditional numeric keypad with alphabet letters associated with a telephone keypad. The input keys may include a trackwheel, an exit or escape key, a trackball, and other navigational or functional keys, which may be inwardly depressed to provide further input function. Another input mechanism may be the LCD 930, which may include touch screen capability and also display text and/or graphics to the user. The LCD controller 932 couples the DSP 902 to the LCD 930.

The CCD camera 934, if equipped, enables the UE 801 to take digital pictures. The DSP 902 communicates with the CCD camera 934 via the camera controller 936. In another embodiment, a camera operating according to a technology other than Charge Coupled Device cameras may be employed. The GPS sensor 938 is coupled to the DSP 902 to decode global positioning system signals, thereby enabling the UE 801 to determine its position. Various other peripherals may also be included to provide additional functions, e.g., radio and television reception.

Figure 10:
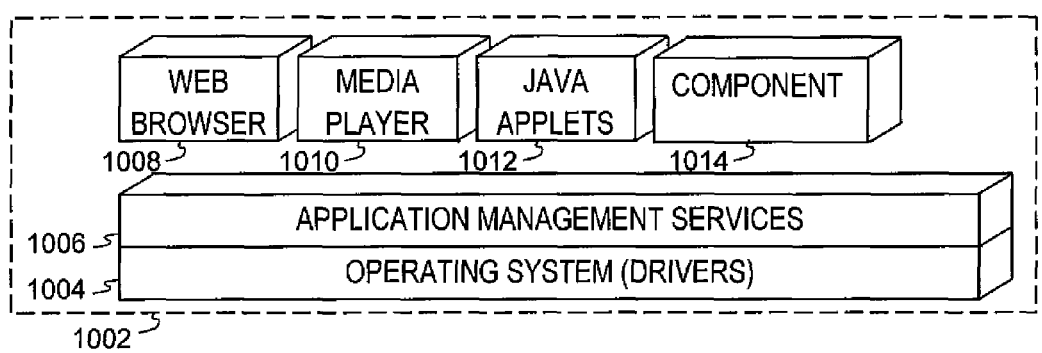
FIG. 10 is a diagram of an embodiment of a software environment that may be implemented on a UE operable for some of the various embodiments of the disclosure.

FIG. 10 illustrates a software environment 1002 that may be implemented by the DSP 902. The DSP 902 executes operating system drivers 1004 that provide a platform from which the rest of the software operates. The operating system drivers 1004 provide drivers for the wireless device hardware with standardized interfaces that are accessible to application software. The operating system drivers 1004 include application management services ("AMS") 1006 that transfer control between applications running on the UE 801. Also shown in FIG. 10 are a web browser application 1008, a media player application 1010, and Java applets 1012. The web browser application 1008 configures the UE 801 to operate as a web browser, allowing a user to enter information into forms and select links to retrieve and view web pages. The media player application 1010 configures the UE 801 to retrieve and play audio or audiovisual media. The Java applets 1012 configure the UE 801 to provide games, utilities, and other functionality. A component 1014 might provide functionality related to the resource management.

Figure 11:
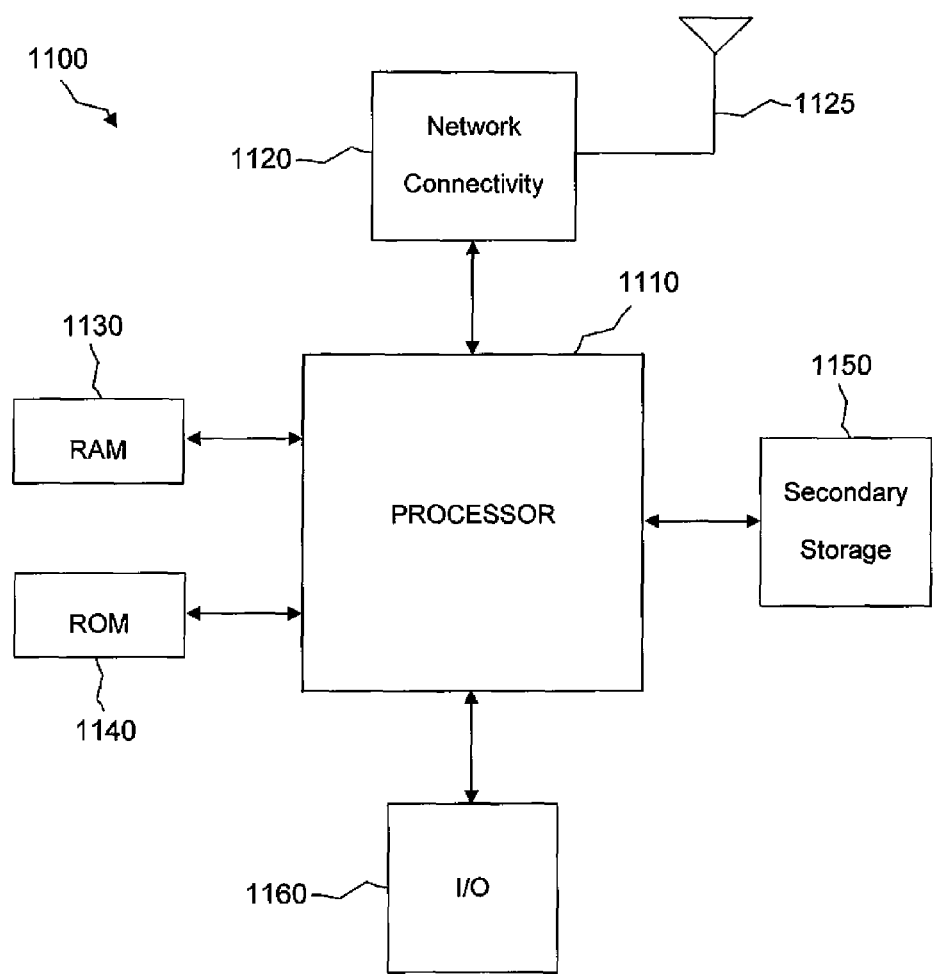
FIG. 11 is a diagram of an embodiment of a general-purpose computer system suitable for implementing the several embodiments of the present disclosure.

The system described above may be implemented on any general-purpose computer with sufficient processing power, memory resources, and network throughput capability to handle the necessary workload placed upon it. FIG. 11 illustrates a typical, general-purpose computer system suitable for implementing one or more embodiments disclosed herein. The computer system 1100 includes a processor 1110 (which may be referred to as a central processing unit or CPU) that is in communication with memory devices comprising a network connectivity device 1120, a random access memory (RAM) 1130, a read only memory (ROM) 1140, a secondary storage 1150, and an input/output (I/O) device 1160. The processor 1110 may be implemented as one or more CPU chips.

The secondary storage 1150 is typically comprised of one or more disk drives or tape drives and is used for non-volatile storage of data and as an over-flow data storage device if RAM 1130 is not large enough to hold all working data. Secondary storage 1150 may be used to store programs which are loaded into RAM 1130 when such programs are selected for execution. The ROM 1140 is used to store instructions and perhaps data which are read during program execution. ROM 1140 is a non-volatile memory device which typically has a small memory capacity relative to the larger memory capacity of secondary storage. The RAM 1130 is used to store volatile data and perhaps to store instructions. Access to both ROM 1140 and RAM 1130 is typically faster than to secondary storage 1150.

I/O devices 1160 may include printers, video monitors, liquid crystal displays (LCDs), touch screen displays, keyboards, keypads, switches, dials, mice, track balls, voice recognizers, card readers, paper tape readers, or other well-known input/output devices.

The network connectivity devices 1120 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity devices 1120 may enable the processor 1110 to communicate with an Internet or one or more intranets. With such a network connection, it is contemplated that the processor 1110 might receive information from the network, or might output information to the network in the course of performing the above-described method steps. Such information, which is often represented as a sequence of instructions to be executed using processor 1110, may be received from and outputted to the network, for example, in the form of a computer data signal embodied in a carrier wave. The network connectivity devices 1120 may also include one or more transmitter and receivers for wirelessly or otherwise transmitting and receiving signal as are well known to one of ordinary skill in the art.

Such information, which may include data or instructions to be executed using processor 1110 for example, may be received from and outputted to the network, for example, in the form of a computer data baseband signal or signal embodied in a carrier wave. The baseband signal or signal embodied in the carrier wave generated by the network connectivity devices 1120 may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 1110 executes instructions, codes, computer programs, scripts which it accesses from hard disk, floppy disk, optical disk (these various disk based systems may all be considered secondary storage 1120), ROM 1140, RAM 1130, or the network connectivity devices 1120. While only one processor 1110 is shown, multiple processors may be present. Thus, while instructions may be discussed as executed by a processor, the instructions may be executed simultaneously, serially, or otherwise executed by one or multiple processors.

The following 3rd Generation Partnership Project (3GPP) Technical Specifications (TS): TS 23.401 (version 8.3.0), TS 23.203 (version 8.3.1), TS 36.212 (version 8.4.0), TS 36.213 (version 8.4.0), and TS 36.300 (version 8.6.0) are incorporated herein by reference for all purposes.

In an embodiment, a network component is provided comprising a plurality of encoders, a plurality of rate-matching modules coupled to the encoders, and a channel interleaver coupled to the rate-matching modules, wherein the rate-matching modules calculate the number of bits for rate matching a plurality of feedback control information based on a total number of bits allocated to a channel traffic without a traffic data.

In another embodiment, a network component is provided comprising a plurality of decoders, and a plurality of rate-dematching modules coupled to the decoders, wherein the rate-dematching modules calculate the number of bits for rate dematching a plurality of feedback control information based on a total number of bits allocated to a channel traffic without a transport data.

In another embodiment, a network component is provided comprising at least one processor configured to encode a plurality of feedback control information, and calculate the number of bits for rate-matching the feedback control information based on a total number of bits allocated to a channel traffic without a traffic data.

In another embodiment, a network component is provided comprising at least one processor configured to calculate the number of bits for rate-dematching a plurality of feedback control information based on a total number of bits allocated to a channel traffic without a traffic data, and decode the feedback control information.

In another embodiment, a method is provided comprising receiving a downlink traffic, detecting a request to transmit uplink data in the downlink traffic, and transmitting feedback control information with or without data based on the request.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A network component comprising:
a plurality of encoders;
a plurality of rate-matching modules coupled to the encoders;
a channel interleaver coupled to the rate-matching modules,
wherein the rate-matching modules calculate the number of bits for rate matching a plurality of feedback control information based on a total number of bits allocated to a channel traffic without a traffic data, and wherein the feedback control information comprises a channel quality information (CQI), a rank indication (RI), a hybrid automatic repeat request acknowledgement (HARQ-ACK), or combinations thereof;
a virtual data generator; and
a multiplexer coupled to the virtual data generator module and a rate-matching module associated with the CQI.

2. The network component of claim 1, wherein the multiplexer concatenates the virtual data and CQI, and wherein the channel interleaver combines the virtual data, CQI, and RI and punctures the HARQ-ACK into the virtual data, CQI, and RI.

3. The network component of claim 2, wherein the virtual data is assigned at least one special value or resource elements associated with the virtual data are padded.

4. The network component of claim 1, wherein the virtual data is modulated with a power level of about zero and is not encoded.

5. The network component of claim 1, wherein a size of the virtual data is equal to about a size of an allocated transport block size in an uplink grant.

6. A network component comprising:
a plurality of decoders;
a plurality of rate-dematching modules coupled to the decoders,
wherein the rate-dematching modules calculate the number of bits for rate dematching a plurality of feedback control information based on a total number of bits allocated to a channel traffic without a transport data, and wherein the feedback control information comprises a channel quality information (CQI), a rank indication (RI), a hybrid automatic repeat request acknowledgement (HARQ-ACK), or combinations thereof;
a virtual data module; and
a demultiplexer coupled to the virtual data module and rate-dematching module associated with the CQI,
wherein the virtual data module calculates the number of bits occupied by virtual data.

7. The network component of claim 6, wherein a deinterleaver extracts the HARQ-ACK from the virtual data, CQI, and RI, and then separates the RI from the concatenated virtual data and CQI, and then the demultiplexer separates the virtual data and CQI.

8. The network component of claim 7, wherein the virtual data is distinguished from transport data by detecting at least one special value assigned to the virtual data or a plurality of padded resource elements.

9. The network component of claim 6, wherein the virtual data is distinguished from transport data by detecting an average power level of about zero of a received signal corresponding to resource elements associated with the virtual data.

\* \* \* \* \*